United States Patent
Khokhlov et al.

(10) Patent No.: US 11,909,025 B2
(45) Date of Patent: Feb. 20, 2024

(54) AIR ELECTRODE ASSEMBLIES INCORPORATING ION EXCHANGE MATERIALS

(71) Applicant: Zelos Energy Ltd., San Leandro, CA (US)

(72) Inventors: Pavel Khokhlov, San Ramon, CA (US); Alexander Gorer, Brisbane, CA (US)

(73) Assignee: Zelos Energy Ltd., San Leandro, CA (US)

( * ) Notice: Subject to any disclaimer, the term of this patent is extended or adjusted under 35 U.S.C. 154(b) by 162 days.

(21) Appl. No.: 17/326,227

(22) Filed: May 20, 2021

(65) Prior Publication Data

US 2021/0367293 A1 Nov. 25, 2021

Related U.S. Application Data (60) Provisional application No. 63/029,142, filed on May 22, 2020.

(51) Int. Cl.

| | |
|---|---|
| *H01M 12/08* | (2006.01) |
| *H01M 12/06* | (2006.01) |
| *H01M 4/38* | (2006.01) |
| *C25B 1/46* | (2006.01) |
| *C25B 9/23* | (2021.01) |
| *C25B 13/02* | (2006.01) |
| *C25B 11/04* | (2021.01) |

(52) U.S. Cl.
CPC .............. *H01M 12/08* (2013.01); *C25B 1/46* (2013.01); *C25B 9/23* (2021.01); *C25B 11/04* (2013.01); *C25B 13/02* (2013.01); *H01M 4/38* (2013.01); *H01M 12/06* (2013.01)

(58) Field of Classification Search
CPC    C25B 9/23; C25B 11/04; H01M 4/38; H01M 12/06; H01M 12/08; H01M 2300/0068
See application file for complete search history.

(56) References Cited

U.S. PATENT DOCUMENTS

| | | | | |
|---|---|---|---|---|
| 2011/0027664 A1* | 2/2011 | Burchardt | ............. | H01M 12/06 429/403 |
| 2012/0321970 A1* | 12/2012 | Friesen | ................. | H01M 12/08 429/479 |
| 2016/0308220 A1* | 10/2016 | Qi | ....................... | H01M 4/8647 |

* cited by examiner

*Primary Examiner* — Scott J. Chmielecki
(74) *Attorney, Agent, or Firm* — David R. Stevens; Stevens Law Group (57) ABSTRACT

An electrochemical cell includes a first electrode which is an air electrode and a second electrode. An ion transport material can be positioned between and contacting both electrodes. An ion exchange material is arranged to contact the air electrode and the ion transport material. In some embodiments the second electrode can include zinc.

21 Claims, 7 Drawing Sheets

AIR ELECTRODE ASSEMBLIES INCORPORATING ION EXCHANGE MATERIALS

RELATED APPLICATIONS

This application claims the benefit of U.S. Provisional Application Ser. No. 63/029,142, filed May 22, 2020, which is hereby incorporated herein by reference in its entirety for all purposes.

TECHNICAL FIELD

The present disclosure relates generally to the field of batteries and electrolyzers. More specifically, the present application relates to electrochemical cells that include an air electrode with an ion exchange material component.

BACKGROUND

There is a great demand for low cost rechargeable battery systems with a high energy density for portable devices, electric vehicles, grid storage and other applications. Recently lithium ion batteries have become a popular technology of choice for many energy storage applications. Unfortunately, limited availability of key metals, high energy costs and safety risks associated with Li-ion technology limit wide adoption of the batteries in many application.

As an alternative, batteries with air electrodes have been used. For example, a zinc-air electrochemical reaction system can include a cathode Oxygen Reduction Reaction (ORR):

$$O_2 + 2H_2O + 4e^- \rightarrow 4OH^- \quad (E_0 = 0.4 \text{ V})$$

At anode, in Zn-air battery:

$$Zn + 2OH^- \rightarrow ZnO + H_2O + 2e^- \quad (E_0 = -1.25 \text{ V})$$

With a total reaction being:

$$2Zn + O_2 \rightarrow 2ZnO \quad (E_0 = 1.65 \text{ V}).$$

In practice however, the voltage of this reaction is much lower (less than 1.2V) than theoretical due to the activation, ohmic polarization and concentration loss due to inefficiencies in the ORR and design of the air electrode.

As an additional problem, design of an integrated air electrode for Zn-air battery or industrial electrolysis is complicated. Typically, air electrodes mix catalyst (Ag, Pt, Ni as example), high surface area porous carbon materials, polymer binder (PTFE) and press slurry onto current collector (CC) made out of nickel foam or other metal mesh as an example. The wettability of air electrode is determined by the proportion of carbon supports and PTFE. The proportion is chosen such that the active layer could be only partly wetted by the electrolyte. This is done in this way in order to prevent a possible flooding of the back side of the catalyst layer which is responsible for the reaction with the gas (which cannot be dissolved). A gas diffusion layer (GDL) usually has very different wettability (extremely hydrophobic) from other electrode components. The wettability management of air electrodes is of extremely important, since electrolyte flooding into the GDL can destroy the air electrode.

Systems and components that include efficient and stable air electrodes that reduce voltage losses and decrease electrolyte flooding risk are needed.

Additionally, efficient and stable air electrodes are useful components for an electrolysis process. This can include, for example, NaCl electrolysis using electrolyzers with depolarized oxygen electrodes.

SUMMARY

In one embodiment, an electrochemical cell includes an electrode and an ion exchange material arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material. In another embodiment, electrode particles can be mixed or otherwise intermingled with ion exchange material.

In some embodiments the electrochemical cell is a rechargeable or primary battery cell. In other embodiments the electrochemical cell is an electrolyzer cell.

In some embodiments the electrode can include a zinc (Zn), zinc oxide (ZnO) or zinc hydroxide (Zn(OH)2) containing anode. In some embodiments the electrode can include a iron oxide or iron hydroxide containing anode. In some embodiments the electrode can include aluminum (Al) containing anode. In some embodiments the electrode can include lithium (Li) containing anode. In some embodiments the electrode can include sulfur (S) containing anode.

The electrode can at least partially include electrode particles sized to be less than 300 microns and packed to have a pore volume less than 50% of total electrode volume.

In some embodiments the ion exchange material can include either an anion exchange material or a cation exchange material. The ion exchange material can include a polymeric material having attached charged functional groups.

In some embodiments, ion transport can be enabled by a liquid alkaline electrolyte contacting the electrodes. Optionally, the electrolyte can have at least some incorporated ion exchange material.

In one embodiment, the rechargeable battery cell can include an electrode that includes a plurality of particles and an ion exchange material contacting and surrounding at least a portion of particles of the electrode.

In one embodiment, the rechargeable battery cell can include an electrode comprising a plurality of particles an ion exchange material contacting and completely surrounding a surface of each of the plurality of particles.

In one embodiment, the rechargeable battery cell can include an electrode comprising a plurality of particles and an ion exchange material arranged to embed substantially all of the plurality particles of the electrode.

In one embodiment, a method of manufacturing a rechargeable battery cell can include forming a plurality of particles into an electrode and embedding or mixing an ion exchange material into at least some of the plurality particles of the electrode. Embedding can involve at least one of melting, softening, depositing from a melt or solution, laminating, and pressure application.

In some embodiments manufacture can involve soaking the electrode in a liquid electrolyte.

In some embodiments, manufacture can involve assembling the electrode and the ion exchange material into a battery prior to embedding or mixing the ion exchange material into at least some of the plurality particles.

In another embodiment an electrochemical cell includes a first electrode including an air electrode and a second electrode. An ion transport material can be positioned between and contacting both the air electrode and the second electrode. An ion exchange material is arranged to contact the air electrode and the ion transport material.

In some embodiments the air electrode includes a gas diffusion layer.

In some embodiments the air electrode includes a current collector.

In some embodiments, the air electrode includes an active layer.

In some embodiments the air electrode includes a current collector positioned between a gas diffusion layer and an active layer.

In some embodiments the ion transport material is a liquid electrolyte.

In some embodiments the ion transport material comprises an ion exchange material. In some embodiments the second electrode further comprises a zinc (Zn) containing anode.

In some embodiments the ion exchange material further comprises a polymeric material.

In some embodiments the ion exchange material further comprises a polymeric material having attached positively charged functional groups.

In another embodiment the air electrode includes an active layer and an ion exchange material arranged to contact the active layer.

In another embodiment a method of manufacturing a battery cell includes providing a first electrodes including an air electrode and a second electrode. An ion exchange material is arranged to contact the air electrode. An ion transport material is then provided to contact both the ion exchange material of the air electrode and the second electrode.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

The present disclosure relates in part to battery cells having improved cycle life and electrical performance in service. For example, the cells can exhibit higher battery discharge voltage, higher discharge capacity, lower internal resistance, and high-rate discharge capability. In some embodiments, the disclosed battery cells have a long cycle lifetime at high-rate discharge current.

Figure 1:
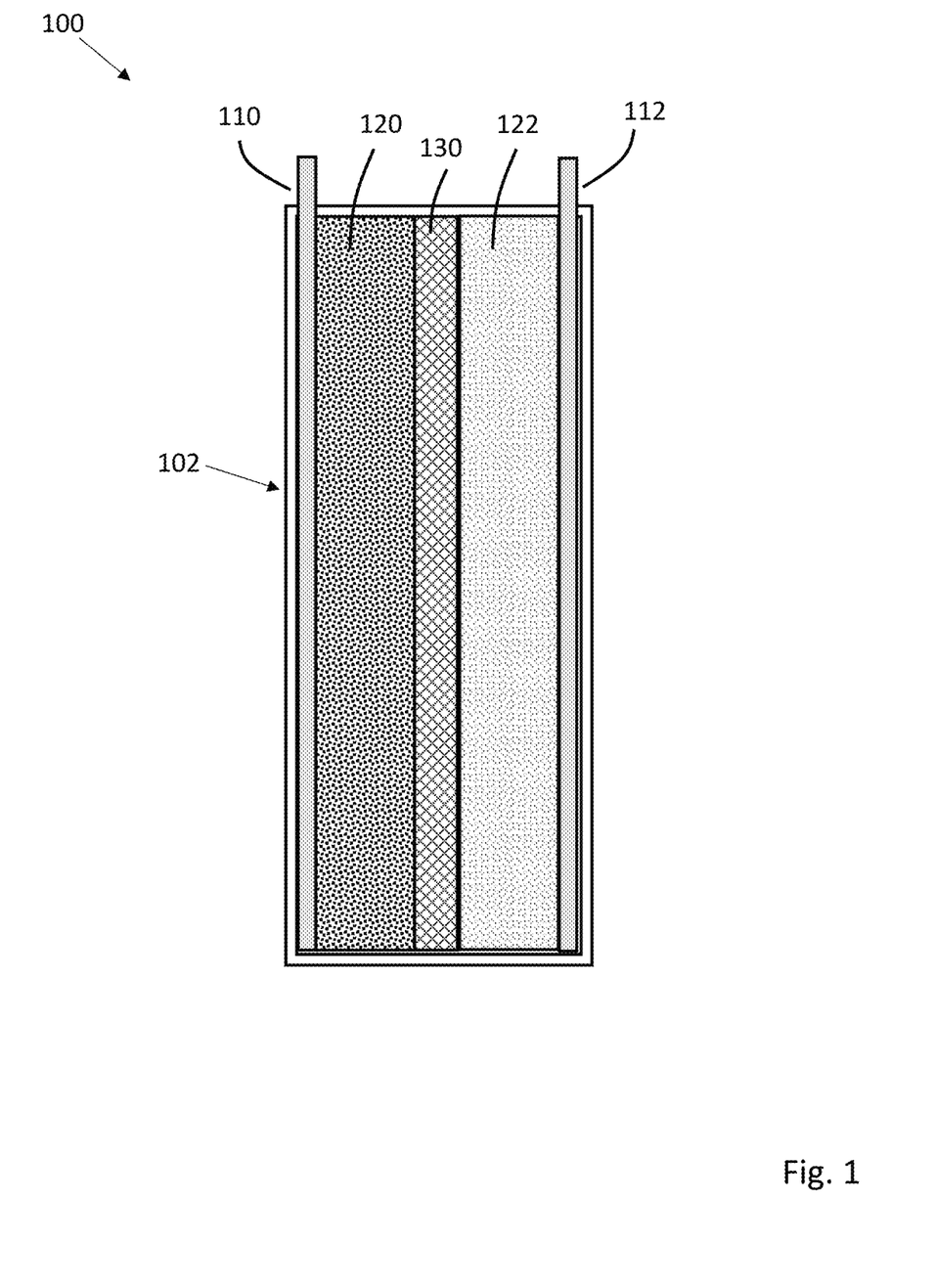
FIG. 1 illustrates a battery containing ion exchange material in contact with electrode material.

FIG. 1 illustrates a rechargeable battery cell system 100 that includes a casing 102 that surrounds various battery components. Battery components can include current collectors 110 and 112 that facilitate charge and discharge of the battery cell system 100. Other components include electrode material 120 and 122 that respectively contact current collectors 110 and 112. The electrode material 120 and 122 are separated from each other by a separator 130 that only permits ion flow between the material. The rechargeable battery cell system 100 can include anode, cathode, ion exchange, and other materials and components as described in the following:

Electrodes

Electrode material can include material formed as thin films, or structured patterns such as columns, needles, groove, or slots. In some embodiments electrodes can be loosely arranged materials, rigidly bound or sintered structures, or solid continuous pore structures. In one embodiment, electrodes can be formed from particles provided in various forms such as powders, granules, pellets, or nanomaterial. In certain embodiments, particles can have an average size (diameter or longest dimension) of between about 0.1 µm to 300 µm, and in a specific embodiment, between about 100 µm and 1 µm. In some embodiments, relatively homogeneous particle sizes can be used, while in other embodiments heterogenous sized materials can be used. Particles can be processed to increase effective surface area. In some embodiments, particles can be processed by heating, melting, fusing, or sintering to bind together the particles. In other embodiments, additional binders can be used to hold particles together. In some embodiments, air or other gas based electrodes can include structures for admitting air and providing active sites for chemical reactions.

Collectors

At least a portion of electrode material is placed in contact with a current collector. The current collector serves to supply an electric current so that it can be consumed for the electrode reaction during charge and collect an electric current generated during discharge. The current collector is typically formed from a material which has a high electrical conductivity and is inactive to electrochemical battery cell reaction. The current collector may be shaped in a plate form, foil form, mesh form, porous form-like sponge, punched or slotted metal form, or expanded metal form.

The material of the current collector can include Ni, Ti, Cu, Al, Pt, V, Au, Zn, and alloys of two or more of these metals such as stainless steel. Other embodiments can graphite cloth, copper sheet or mesh slotted woven brass.

Anode Material

Anode materials for an electrode can include a wide range of materials such as zinc, aluminum, magnesium, iron, sulfur and lithium and other metals in pure, oxide form, hydroxide form or salt form, or combinations thereof. In some embodiments, relatively pure Zn, ZnO or a mixture of Zn and ZnO can be used. For a rechargeable zinc negative electrode, the electrochemically active material is the zinc oxide powder or a mixture of zinc and zinc oxide powder. The zinc oxide can dissolve in an alkaline electrolyte to form the zincate ($Zn(OH)_4^{2-}$). Zinc oxide or/and zincate is reduced to zinc metal during the charging process.

More broadly, anode materials can include:

Any metal M, metal oxide MOx or metal salt having a redox potential E0 lower than the redox potential of the cathode material.

Any metal oxide MOx having a redox potential E0 lower than the redox potential of the cathode material.

Any alloy of any metals MM1M2 . . . Mn, mixed oxides or mixed salts having a E0 lower than the E0 of the cathode material.

Any polymer that can accommodate anions in its structure having a redox potential E0 lower than the redox potential of the cathode material.

Any mixture of one or more of the above mentioned type of materials.

Cathode Material

Cathode material for an electrode can include a gas breathable electrode with air, oxygen or other gasses as active substances.

Additives and Binding Agents

Various additives can be used to improve electrochemical, electrical, or mechanical features of the electrodes. For example, electrochemical performance can be improved by addition of nickel, nickel hydroxide, nickel oxyhydroxide, or nickel oxide containing cathode material that can incorporate or be coated with small amounts of cobalt oxide, strontium hydroxide ($Sr(OH)_2$), barium oxide (BaO), calcium hydroxide ($Ca(OH)_2$), $Fe_3O_4$, calcium fluoride ($CaF_2$), or yttrium oxide ($Y_2O_3$) to improve battery cell performance. As another example, electrode can includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electrode material. Specific examples of anions that may be included to reduce the solubility of zinc in the electrolyte include phosphate, fluoride, borate, zincate, silicate, or stearate. Generally, these anions may be present in an electrode in concentrations of up to about 10% by weight of a dry electrode formulation.

Additives that improve electrical characteristics such as conductivity can also be added. For example, a range of carbonaceous materials can be used as electrode additives, including powdery or fibrous carbons such as graphite, coke, ketjen black, and acetylene black. Carbonaceous nanomaterials can also be used such as single or multiwalled carbon nanotubes, carbon nanofibers, multi-layered carbon nanoparticles, carbon nanowhiskers, or carbon nanorods.

Additives may be provided as chemically homogeneous components into a mixture or solution, co-precipitated, or coated onto particles Mechanical properties can be improved in one embodiment by addition of binding agents to provide increased electrode mechanical strength, and flexure or crack reduction for the electrode. Binding agents may include, for example, polymeric materials such as polytetrafluoroethylene (PTFE), polyethylene (PE), polypropylene (PP), polyisobutylene polyvinyl alcohol (PVA), polyacrylic acid, polyvinyl acetate, carboxy methyl cellulose (CMC), styrene butadiene rubber (SBR), polyethylene oxide (PEO) polybutylene terephthalate (PBT) or polyamides, polyvinylidene fluoride (PVDF), silicone-based elastomers such as polydimethyl siloxane (PDMS) or rubber materials such as natural rubber (NR), ethylene propylene rubber (EPM) or ethylene propylene diene Ion Exchange Material The ion exchange material is generally selective for the transport of either cations or anions. An anion selective ion exchange material can be used alone, a cation selective ion exchange material can be used alone, or they can be used in combination with each other. In one embodiment the ion exchange material can be an organic or polymeric material having attached strongly acidic groups, such as sulfonic acid including, sodium polystyrene sulfonate, or polyAMPS. Alternatively, the ion exchange material can be an organic or polymeric material having attached strongly basic groups, such as quaternary amino groups including trimethylammonium groups (e.g. polyAPTAC). In another embodiment, the ion exchange material can be an organic or polymeric material having attached weakly acidic groups, including carboxylic acid groups. Alternatively, the ion exchange material can be an organic or polymeric material having attached weakly basic groups, typically featuring primary, secondary, and/or tertiary amino groups (e.g. polyethylene amine).

The ion exchange can be provided to interact with electrode material as a fully or partially embedding polymer, a particle mixture, a membrane or film, particulates or beads, or a coating. The anode alone, the cathode alone, or both the anode or cathode can be configured to interact with an ion exchange material, which can be the same or different material for the respective electrodes.

Electrolyte

An electrolyte is used to maintain high ionic conductivity between electrodes. Electrolytes can be aqueous based, solvent based, solid polymer, or an ionic liquid. In some embodiments, electrolytes can be semi-solid or gelatinized. Gelatinizing agents can include polymers that absorb the liquid of the electrolyte solution and swell. Such polymers can include polyethylene oxide, polyvinyl alcohol, and polyacrylamide.

In another embodiment the electrolyte can be a solid state electrolyte. In another embodiment electrolyte can be formed as a solid material with absorbed water. For example, KOH exposed to humid air.

In another embodiment electrolytes can be formed from ion exchange material such as explained above under "Ion exchange material" section.

In one embodiment aqueous alkaline electrolytes can be used. Alkaline electrolytes can include alkalis such as potassium hydroxide, sodium hydroxide, lithium hydroxide, calcium hydroxide or inorganic salts such as zinc bromide.

Separator

A separator may be replaced with (or used in conjunction with) an ion exchange membrane or film. A conventional porous polymer separator or ion exchange separator may be provided as a polymer membrane or film. Typically, a separator is disposed between the anode and the cathode, and acts to prevent the anode and the cathode from having internal electrical shorts. In addition, the separator can also act to retain the electrolyte, particularly for battery systems that use different cathode and anode electrolyte solutions. The separator is generally required to have a porous structure or a structure having a number of perforations capable of allowing ions to pass while being chemically stable with respect to the electrolyte solution. In some embodiments, one or more separators can be formed by coating electrodes or particles that collectively form an electrode. The separator can be formed from a nonwoven fabric or a membrane having a micropore structure made of glass, polypropylene, polyethylene, resin, or polyamide. Alternatively, the separator may be constituted by a metal oxide film or a resin film combined with a metal oxide respectively having a plurality of perforations.

Processing

In one embodiment, a dry mixing process can be performed in which various anode and cathode materials, as well as additives and binders are mixed while dry. Optional processing steps such as heating, fusing, compressing, and melting ion exchange material can be performed before placing the mixture in a battery casing. In other embodiments, optional processing steps such as heating, fusing, compressing, and melting ion exchange material can be performed after placing the mixture in a battery casing. A liquid electrolyte can be added before sealing the battery casing.

According to other embodiments, a wet mixing process may instead be utilized. In a wet mixing process, one or more solvents are added at the beginning or during the mixing process, or, alternatively, one or more ingredients may be used in the form of a dispersion or suspension. The solvent(s) can be subsequently removed after the mixing process or later state in the production process.

In other embodiments, embodiment, the various individual components may be made using different methods. For example, some of the electrode may be produced using a dry mixing process, while portions of the electrode may be produced using a wet process. According to yet another embodiment, it is possible to combine both dry and wet processes for the different components.

Battery and Cell Design

The battery cells of this invention can have any of a number of different shapes and sizes. For example, coin, prismatic, pouch or cylindrical cells can be used. Cylindrical cells of this invention may have the diameter and length of conventional AAA cells, AA cells, A cells, C, or D cells. Custom cell designs can be used in some applications. For example, prismatic cell designs can be used for portable or vehicular applications, as well as various larger format cells employed for various non-portable applications. A battery pack can be specifically designed for particular tools or applications. Battery packs can include one or more battery cells and appropriate casing, contacts, and conductive lines to permit reliable charge and discharge in an electric device.

Figure 2A:
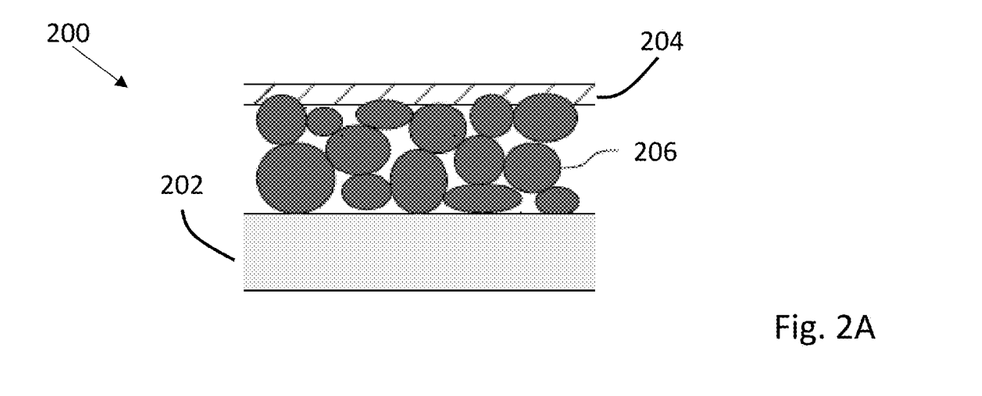
FIGS. 2A-C illustrates various forms of contact between electrode particles and ionic exchange material.
Figure 2B:
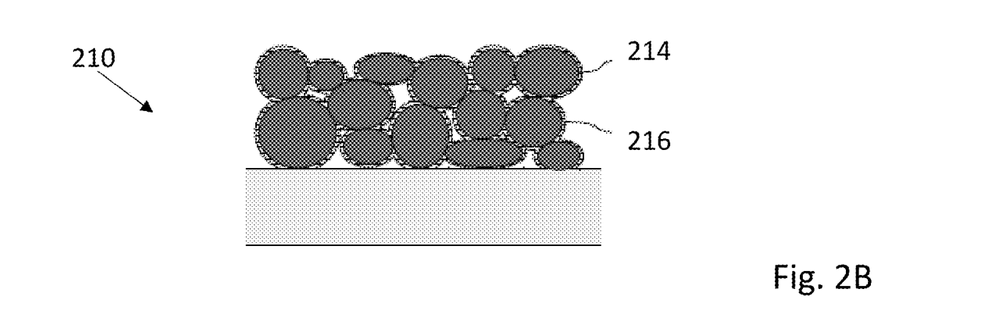
Figure 2C:
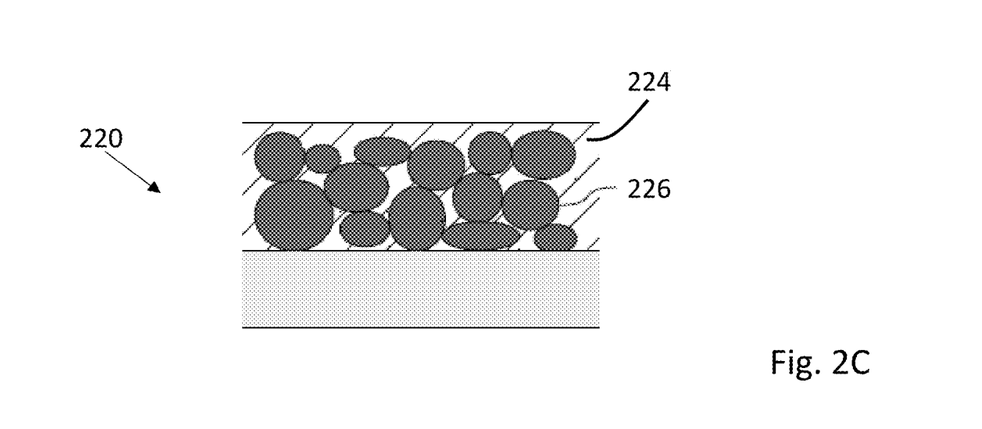

FIGS. 2A-C illustrate a portion of rechargeable battery cells 200, 210, and 220 that include an electrode and an ion exchange material arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material.

FIG. 2A illustrates a rechargeable battery cell 200 including a collector 202 contacting at least some of a plurality of electrochemically active particles 206. Another set of particles 206 also contact and are partially embedded in an ion exchange membrane 204. This ion exchange membrane can be positioned by partially melting, fusing, laminating, or pressure attachment to the particles 206. An electrolyte (not shown) can also be provided to fill in particle pore spaces and contact ion exchange membrane 204.

FIG. 2B illustrates a rechargeable battery cell 210 including a collector 212. Each of particles 216 contact and are surround with in an ion exchange membrane 214. This ion exchange membrane can be positioned by coating attachment to the particles 216 prior to incorporation of the particles into the rechargeable battery cell. An electrolyte (not shown) can also be provided to fill in particle pore spaces and contact ion exchange membrane 214.

FIG. 2C illustrates a rechargeable battery cell 220 including a collector 222 contacting at least some of a plurality of electrochemically active particles 226. Another set of particles 226 also contact and are fully embedded in an ion exchange membrane 224. This ion exchange membrane can be positioned by melting or fusing attachment to the particles 226. An electrolyte (not shown) can also be provided to contact ion exchange membrane 214.

Example 1

The example describes fabrication of a ZnO-based anode for alkaline rechargeable battery with anion exchange membrane embedded into the electrode on the surface by lamination. The following paste composition was used for the anode preparation: ZnO (94 w. %), carbon nanotubes (1 w. %), PTFE (5 w. %). This composition was used to prepare a viscous paste having 27 w. % of water. The paste was spread to form a ~0.6 mm thick uniform film. The film was applied onto brass wire cloth current collector. The anode film applied to the current collector was dried in vacuum at 70° C. overnight and then compressed using a calendar roller press. After that 37 mm×25 mm electrodes were cut out of the film on the current collector, and nickel strip tab was attached to the electrodes. The electrode was laminated with anion exchange membrane on both sides using SKY-325R6 lamination machine at 140° C. using speed setting 2.

Example 2

The example describes fabrication of rechargeable alkaline nickel-zinc cell having ZnO-based anode with anion exchange membrane embedded into the electrode on the surface. The anode for the cell was prepared as described in the Example 1 above. Commercial sintered nickel electrode was used as a cathode. The cathode size was 40 mm×27 mm and capacity 27 mAh/cm$^2$. Nickel strip was welded to each cathode to form electrode tabs. Each cathode was sealed in paper separator. The anode was sandwiched between the cathodes on both sides forming an electrodes stack. The electrodes stack was placed inside polypropylene pouch with attached pressure relief valve so that electrode tabs were sticking out of the pouch. 2 ml of electrolyte (20% KOH in water) was added to the cell. After that the cell was sealed using heat sealer.

Figure 3:
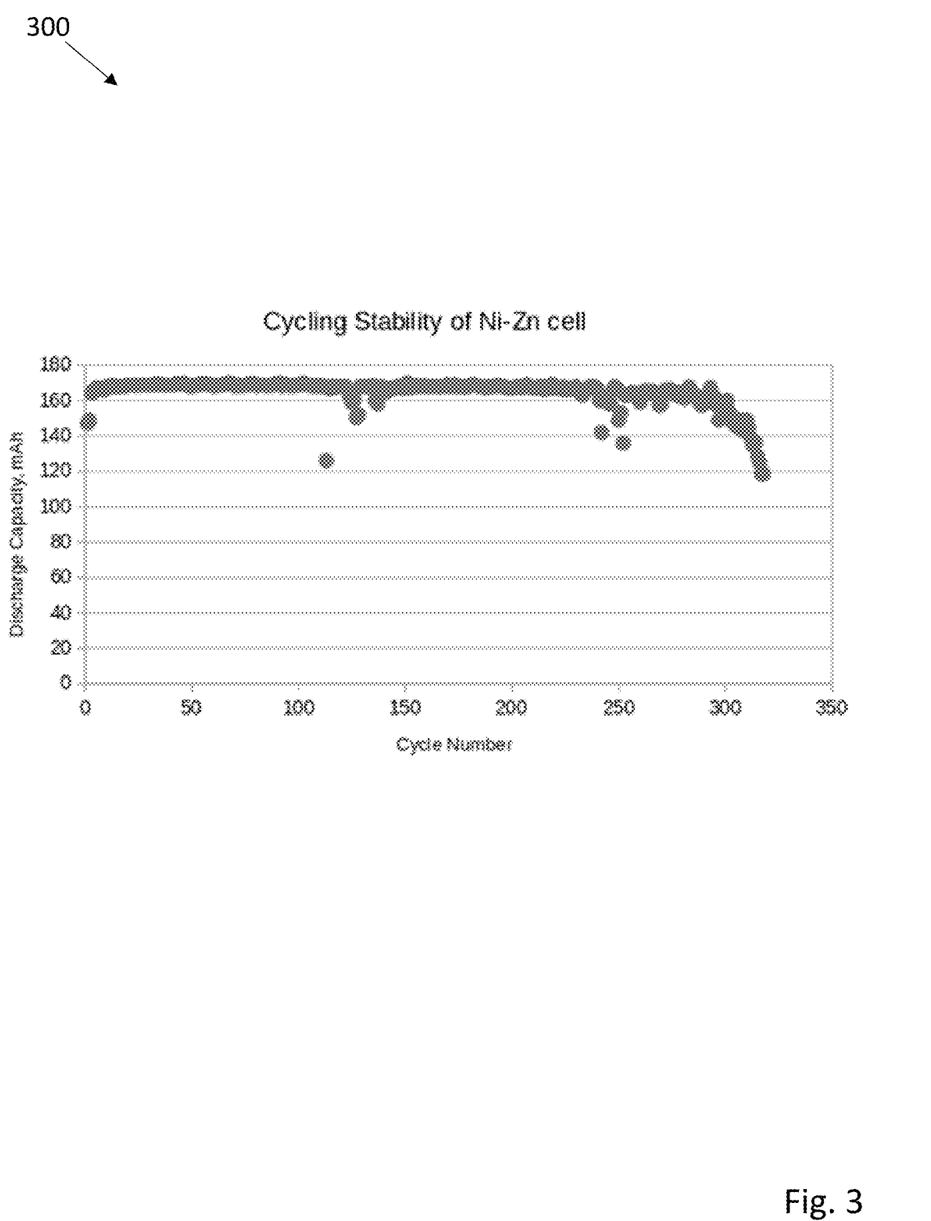
FIG. 3 is a graph illustrating discharge capacity for a Ni—Zn cell as a function of cycle number.

The cell was left soaking for 4 hours and then charged and subsequently subjected to charge-discharge cycling with the following test protocol: constant current charge at 162 mA up to 1.95V followed by constant voltage charge to 173 mAh total capacity; constant current discharge to 1.2V or 173 mAh. The test was carried out at room temperature. Discharge capacity for the Ni—Zn cell as a function of cycle number is illustrated in FIG. 3 as graph 300.

Example 3

The example describes fabrication of a Zn metal-based anode for alkaline rechargeable battery with anion exchange membrane embedded into the electrode on the surface by lamination. The following paste composition was used for the anode preparation: Zn (79 w. %), ZnO (14.5%), $Bi_2O_3$ (0.5%), PTFE (5.8 w. %), CMC (0.2%). This composition was used to prepare a viscous paste having 12 w. % of water. The paste was spread to form a ~0.6 mm thick uniform film. The film was applied onto brass wire cloth current collector. The anode film applied to the current collector was dried in vacuum at 70° C. overnight and then compressed using a calendar roller press. After that 37 mm×25 mm electrodes were cut out of the film on the current collector, and nickel strip tab was attached to the electrodes. The electrode was laminated with anion exchange membrane on both sides using SKY-325R6 lamination machine at 140° C. using speed setting 2.

A cross-section sample was prepared from the formed anode using pot and polish technique. Cross-section SEM images and results of EDX analysis are shown in the FIGS. 4, 5, 6A, and 6B.

Figure 4:
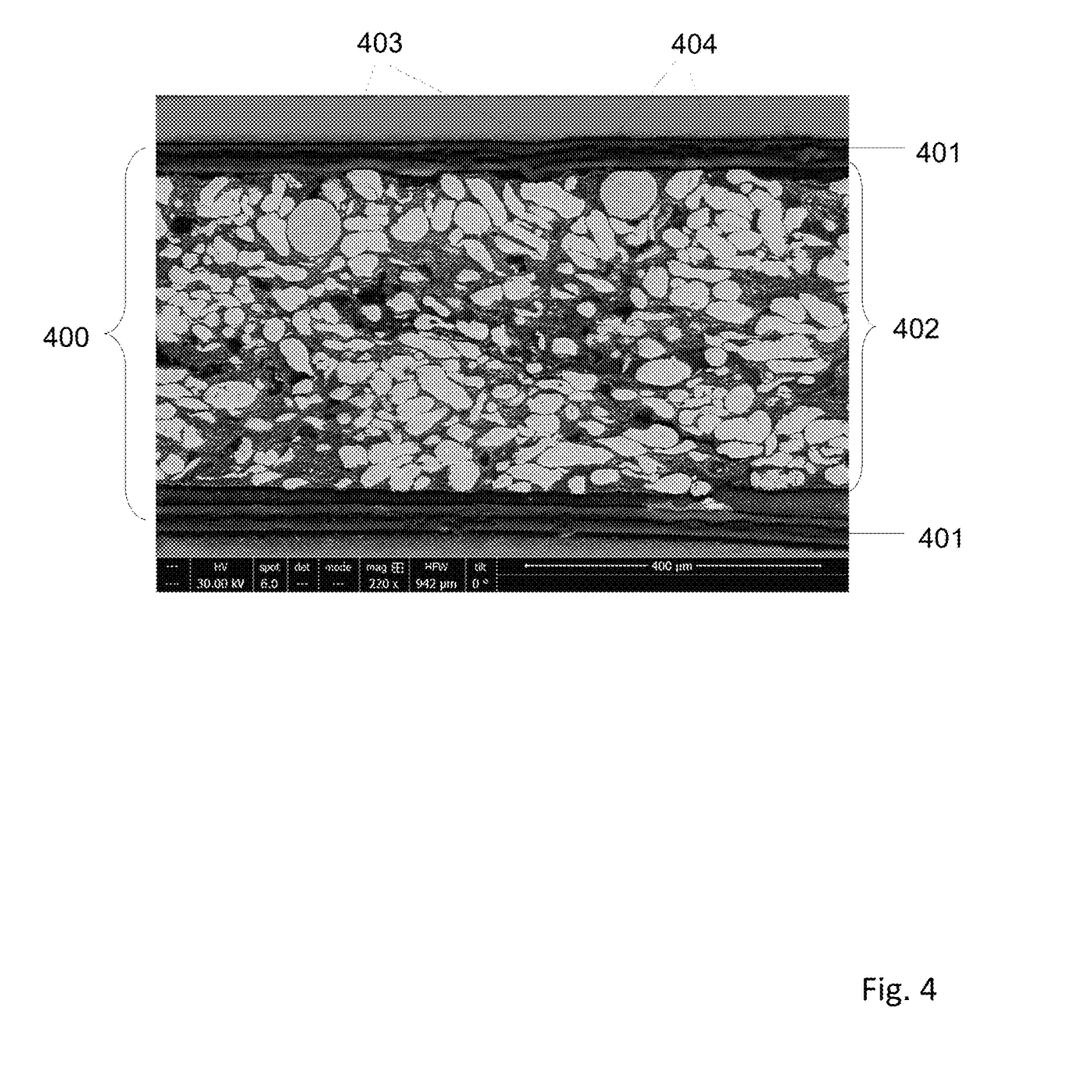
FIG. 4 shows a cross sectional SEM image of Zn electrode laminated on both sides with anion exchange membrane.

FIG. 4 shows a cross sectional SEM image of Zn electrode laminated on both sides with anion exchange membrane. An anode 400 including an anion exchange membrane 401 is laminated on both sides of the electrochemically active layer 402 with embedded brass mesh current collector 403. The electrochemically active layer consists of Zn metal particles 404 are mixed with ZnO, $Bi_2O_3$ as additives and PTFE as a binder.

Figure 5:
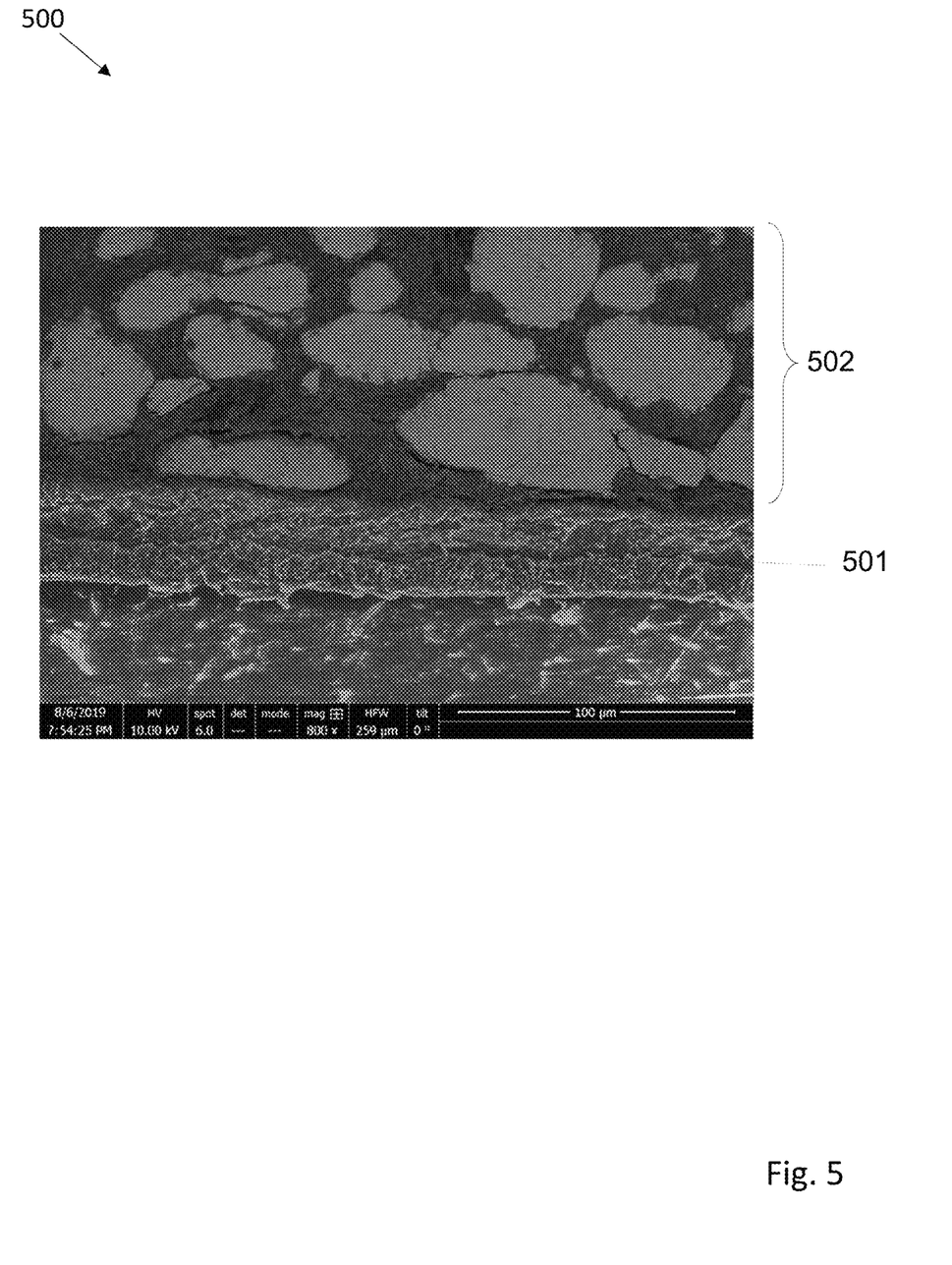
FIG. 5 shows a more detailed SEM image of Zn electrode laminated on both sides with anion exchange membrane.

FIG. 5 shows a SEM image 500 of Zn electrode laminated on both sides with anion exchange membrane (cross-section). The image shows a close up view of an intimate contact between membrane anion exchange material 501 (corresponding to membrane anion exchange material 401 of FIG. 4) and electrode electrochemically active mass 502 (corresponding to electrochemically active layer 402 of FIG. 4).

Figure 6A:
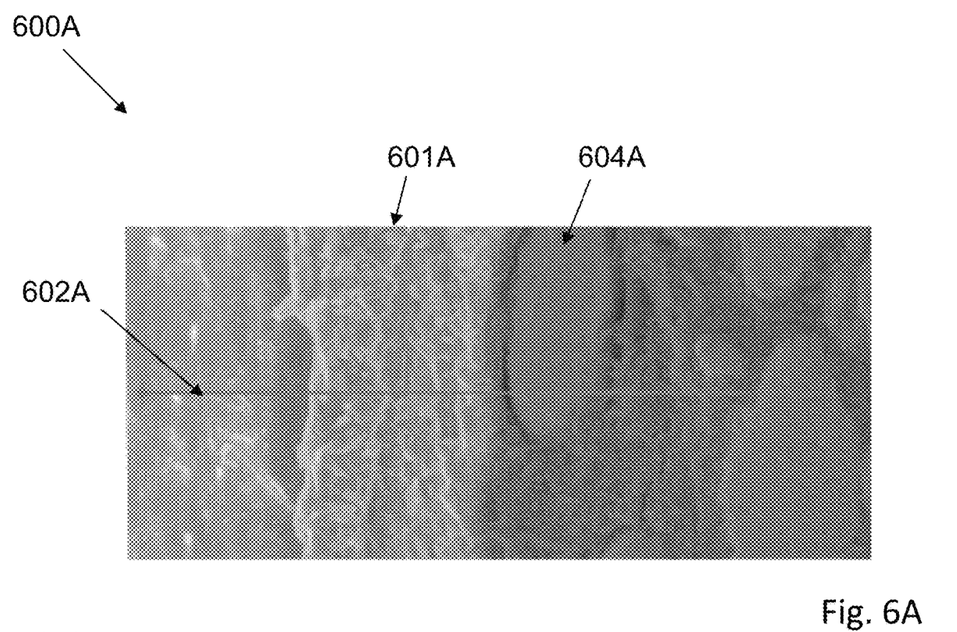
FIGS. 6A and 6B shows an SEM image and an associated line EDX elemental scan.
Figure 6B:
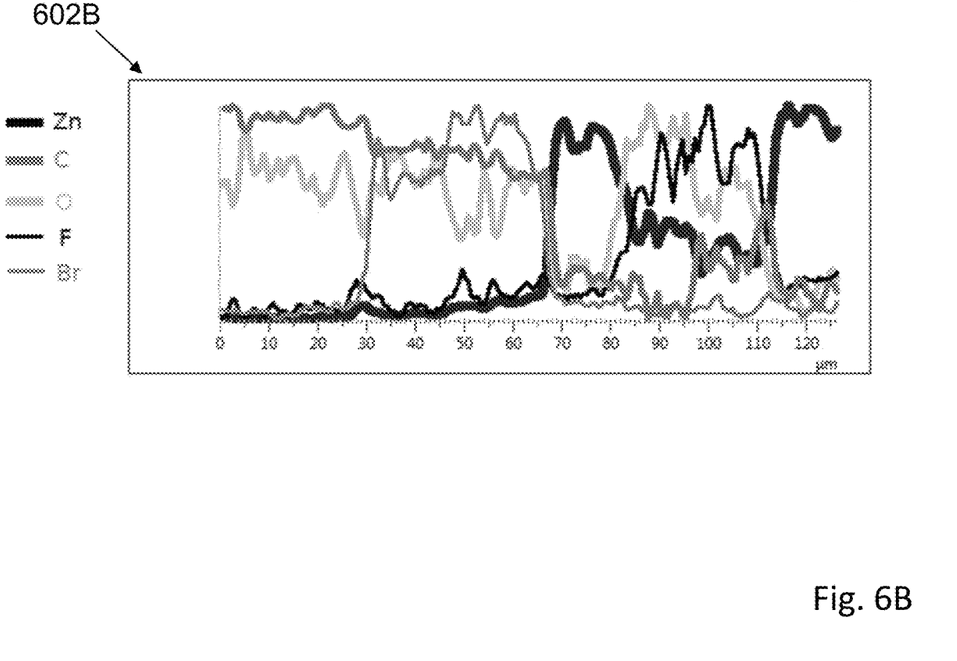

FIG. 6A shows an SEM image (image 600A and EDX elemental cross-section scan line 602A). FIG. 6B is a graph 602B showing the associated EDX elemental cross-section scan (taken along scan line 602A in FIG. 600A) that graphically illustrates the intimate interface between anion exchange membrane 601A (corresponding to membrane anion exchange material 401 of FIG. 4) and a Zn particle 604 (corresponding to Zn particle 404 of FIG. 4) in the anode. Elemental distribution shown overlapping signals for Zn (Zn particle) and C, O and Br (anion exchange membrane components).

Figure 7:
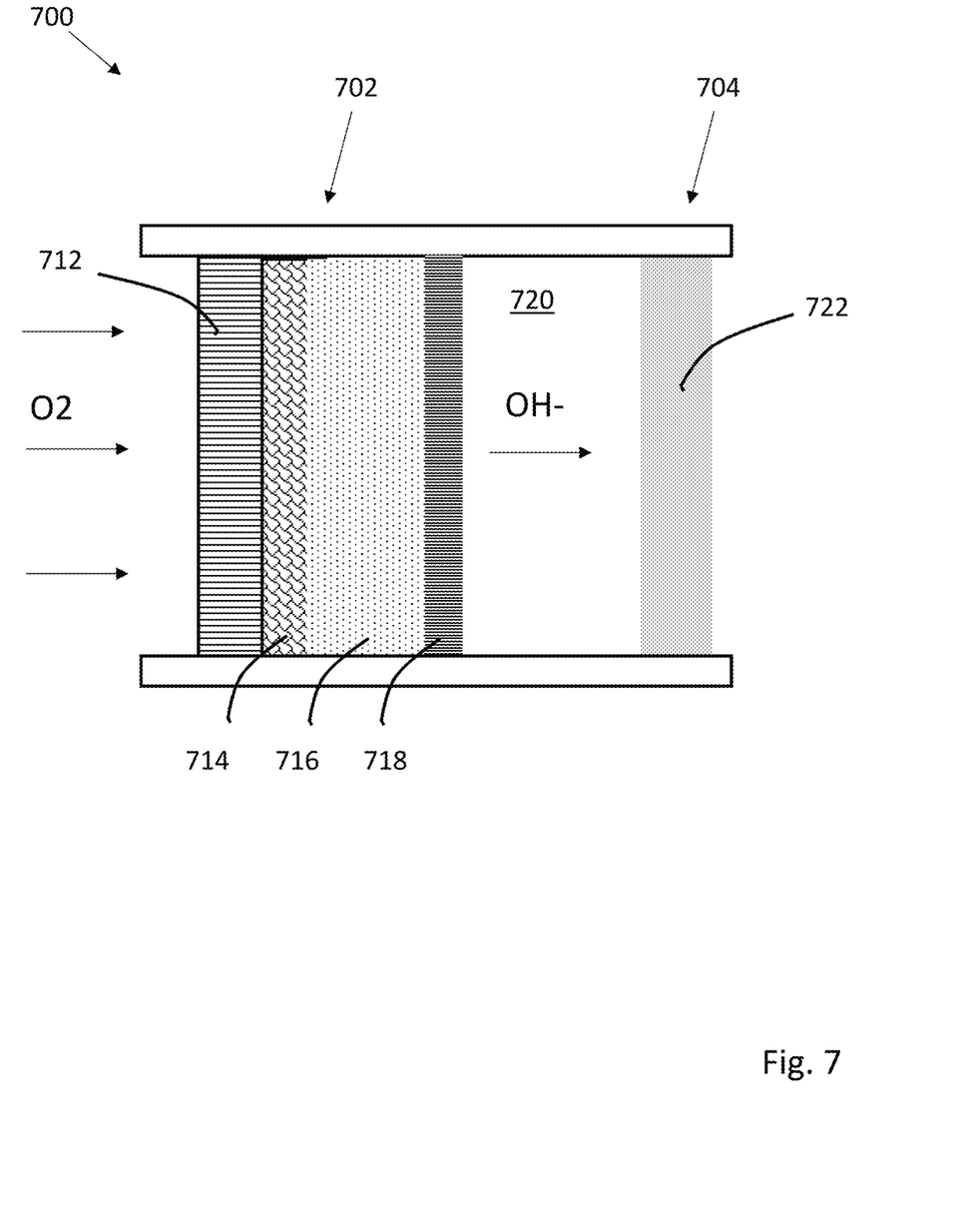
FIG. 7 shows an air-metal battery system utilizing ion exchange material.

FIG. 7 shows one example of an air-metal electrode battery system 700 with included ion exchange material to improve performance. As illustrated, an air electrode 702 is positioned near a metal electrode 704. The air electrode 702 allows for reactive oxygen ($O_2$) is to contact a gas diffusion layer (GDL) 712 backed and in contact with a current collector 714. The current collector 714 can be a conductive metal mesh or foam manufactured from stainless steel or nickel. Contacting the current collector 714 is an active layer 716 which also contacts an anion exchange membrane (AEM) 718. Electrolyte 720 or suitable ion transport material can allow transport of ions (e.g. $OH^-$) toward a metal electrode 704, which in some embodiments can include sheets, particles, needles, or films of zinc or zinc containing material 722.

In some embodiments, the GDL 712 has a high effective surface area that can channel air or oxygen toward catalysts in the active layer 716. The GDL 712 can be hydrophobic to allow for the air contact while reducing risk of leakage of electrolyte 720. A mixture of porous carbon materials and PTFE can be used to manufacture GDL 712.

In some embodiments, an Oxygen Reduction Reaction (ORR) takes place in the active layer 716. The active layer 716 can contain a highly porous substrate to provide space and react with oxygen at the surface of catalysts (increasing specific efficiency of reaction). Porous nano- and microcarbons can be used because of their excellent conductivity, good stability, and corrosion/oxidation resistance. In order to make the catalysts tightly stick to carbon substrates, some polymer binders are can be introduced.

Since the described ORR occurs at a triple phase zone (gas/solid electrocatalyst/liquid electrolyte), excellent contact of oxygen and electrolyte on the surface of electrocatalyst is necessary in order to support this reaction. The wettability (a fragile balance between hydrophobicity and hydrophilicity) defines the sufficient contact of the components of air electrode with the electrolyte.

In some embodiments the AEM 718 can be fully or partially formed from an ion exchange material. The AEM 718 can be applied as a coating or as an attached film to the active layer 716. In some embodiments, at least some particles or portions of the active layer can be partially penetrated with ion exchange material. In other embodiments, ion exchange material can be attached to the active layer 716 by melting, softening, depositing from a melt, laminating, and pressure application Similarly, an ion exchange material can be attached or used to coat the metal electrode 722. In some embodiments, the ion exchange material in AEM 718 can be the same as that contacting metal electrode 722, while in other embodiments different ion exchange material can be used.

In some embodiments, the electrolyte can be a solid, a liquid, or a gel. In other embodiments, the electrolyte 720 can include a functionalized ion exchange material that allows ion transport to the metal electrode 722.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An electrochemical cell, comprising
a first electrode comprising an air electrode;
a second electrode;
an ion transport material positioned between and contacting both the air electrode and the second electrode;
a catalyst layer configured to catalyze an electrochemical reaction in a triple phase zone that includes a gaseous phase, a solid phase, and a liquid phase; and
an ion exchange material arranged to contact the air electrode and the ion transport material, wherein the ion exchange material is configured to conduct one or more ions associated with the electrochemical reaction, wherein the ion exchange material incorporates a wettability property that results in the ion exchange material being only partly wetted by the liquid phase, and wherein the partial wetting further prevents a flooding of the catalyst layer by the liquid phase.

2. The electrochemical cell of claim 1, wherein the electrochemical cell is a battery cell.

3. The electrochemical cell of claim 1, wherein the electrochemical cell is an electrolyzer cell.

4. The electrochemical cell of claim 1, wherein the air electrode comprises a gas diffusion layer.

5. The electrochemical cell of claim 1, wherein the air electrode comprises a current collector.

6. The electrochemical cell of claim 1, wherein the wettability is defined as a balance between hydrophobicity and hydrophilicity.

7. The electrochemical cell of claim 1, wherein the air electrode comprises a current collector positioned between a gas diffusion layer and an active layer.

8. The electrochemical cell of claim 1, wherein the ion transport material is a liquid electrolyte.

9. The electrochemical cell of claim 1, wherein the ion transport material comprises an ion exchange material.

10. The electrochemical cell of claim 1, wherein the electrochemical cell is a battery cell and the second electrode further comprises a zinc (Zn) containing anode.

11. The electrochemical cell of claim 1, wherein the ion exchange material further comprises a polymeric material.

12. The electrochemical cell of claim 1, wherein the ion exchange material further comprises a polymeric material having attached positively charged functional groups.

13. An air electrode, comprising
an active layer;
a catalyst layer configured to catalyze an electrochemical reaction in a triple phase zone that includes a gaseous phase, a solid phase, and a liquid phase; and
an ion exchange material arranged to contact the active layer, wherein the ion exchange material incorporates a wettability property that results in the ion exchange material being only partly wetted by the liquid phase, and wherein the partial wetting further prevents a flooding of the catalyst layer by the liquid phase.

14. The air electrode of claim 13, wherein the air electrode comprises a gas diffusion layer positioned to contact air.

15. The air electrode of claim 13, wherein the air electrode comprises a current collector positioned to contact the active layer.

16. The air electrode of claim 13, wherein the active layer comprises a porous carbon substrate.

17. The air electrode of claim 13, wherein the air electrode comprises a current collector positioned between a gas diffusion layer and an active layer.

18. A method of manufacturing an electrochemical cell, comprising
providing a first electrode comprising an air electrode;
providing a second electrode;
arranging an ion exchange material to contact the air electrode, wherein the ion exchange material is configured to conduct one or more ions associated with an electrochemical reaction associated with the electrochemical cell;
providing an ion transport material to contact both the ion exchange material of the air electrode and the second electrode;
providing a catalyst layer configured to catalyze an electrochemical reaction in a triple phase zone that includes a gaseous phase, a solid phase, and a liquid phase; and
incorporating a wettability property into the ion exchange material, wherein the wettability results in the ion exchange material being only partly wetted by the liquid phase, and wherein the partial wetting further prevents a flooding of the catalyst layer by the liquid phase.

19. The electrochemical cell of claim 1, wherein the wettability is determined by a proportion of one or more carbon supports and a polymer binder in the ion exchange material.

20. The air electrode of claim 13, wherein the wettability is determined by a proportion of one or more carbon supports and a polymer binder in the ion exchange material.

21. The method of claim 18, wherein the wettability is determined by a proportion of one or more carbon supports and a polymer binder in the ion exchange material.

* * * * *